United States Patent
Gradolewski et al.

(10) Patent No.: US 12,273,497 B2
(45) Date of Patent: Apr. 8, 2025

(54) STEREOVISION METHOD AND SYSTEM

(71) Applicant: BIOSECO SP. Z O.O., Gdansk (PL)

(72) Inventors: Dawid Gradolewski, Gdansk (PL); Adam Jaworski, Suchy Dwor (PL); Damian Dziak, Tczew (PL); Damian Kaniecki, Gdynia (PL); Wlodek Kulesza, Lodz (PL)

(73) Assignee: BIOSECO SP. Z O.O., Gdansk (PL)

( * ) Notice: Subject to any disclaimer, the term of this patent is extended or adjusted under 35 U.S.C. 154(b) by 0 days.

(21) Appl. No.: 18/253,963

(22) PCT Filed: Nov. 22, 2021

(86) PCT No.: PCT/EP2021/082552
§ 371 (c)(1),
(2) Date: May 23, 2023

(87) PCT Pub. No.: WO2022/106702
PCT Pub. Date: May 27, 2022

(65) Prior Publication Data
US 2024/0007601 A1 Jan. 4, 2024

(30) Foreign Application Priority Data

Nov. 23, 2020 (GB) .................................. 2018391
Nov. 23, 2020 (PL) ................................... 436051

(51) Int. Cl.
*G06T 7/70* (2017.01)
*H04N 13/00* (2018.01)
*H04N 13/106* (2018.01)

(52) U.S. Cl.
CPC .......... *H04N 13/106* (2018.05); *G06T 7/70* (2017.01); *G06T 2207/10021* (2013.01); *G06T 2207/30232* (2013.01); *H04N 2013/0081* (2013.01)

(58) Field of Classification Search
CPC ............................................ G06T 2207/10021
See application file for complete search history.

(56) References Cited

U.S. PATENT DOCUMENTS

| 5,285,397 A | 2/1994 | Heier |
| 5,978,143 A | 11/1999 | Spruck |

(Continued)

FOREIGN PATENT DOCUMENTS

| CN | 106896343 A1 | 6/2017 |
| JP | 1114347 A1 | 1/1999 |

(Continued)

OTHER PUBLICATIONS

Preliminary Report on Patentability for PCT Appl. No. PCT/EP2021/082552 dated May 16, 2023, 7 pages.

(Continued)

*Primary Examiner* — Jayanti K Patel
*Assistant Examiner* — Christopher Kingsbury Glover
(74) *Attorney, Agent, or Firm* — Maine Cernota & Curran

(57) ABSTRACT

A system for determining the distance, D between an object and a base line B, which is a line between a first camera's and a second camera's centres. The system comprises a first camera, a second camera and a processing system configured to receive data from the first camera and the second camera and to determine the position of an object, wherein the first and second cameras are oriented with their optical axes an angle α to the base line, wherein α is substantially non-right angle.

8 Claims, 3 Drawing Sheets

(56) References Cited

U.S. PATENT DOCUMENTS

| | | | | |
|---|---|---|---|---|
| 2005/0030378 A1* | 2/2005 | Stiller | ............ | G06T 7/85 |
| | | | | 348/E7.086 |
| 2013/0050400 A1* | 2/2013 | Stiesdal | ............ | F03D 80/00 |
| | | | | 348/36 |
| 2015/0326830 A1 | 11/2015 | Wang | | |
| 2016/0055400 A1* | 2/2016 | Jorquera | ............ | F03D 17/00 |
| | | | | 416/61 |
| 2017/0217370 A1 | 8/2017 | Yatsuri | | |
| 2020/0277933 A1* | 9/2020 | Wenger | ............ | F03D 80/00 |

FOREIGN PATENT DOCUMENTS

| | | |
|---|---|---|
| JP | H1114347 A1 | 1/1999 |
| WO | WO-2020070897 A1 * | 4/2020 |

OTHER PUBLICATIONS

GB Search Report for Patent Appl. No. GB2018391.9 mail date May 19, 2021, 2 pages.
International Search Report and Written Opinion for PCT Appl. No. PCT/EP2021082552 mail date Feb. 22, 2022, 11 pages.
Columbian Office Action for Patent Application No. 2023/0007423, mail date Oct. 30, 2024, 20 pages.

* cited by examiner

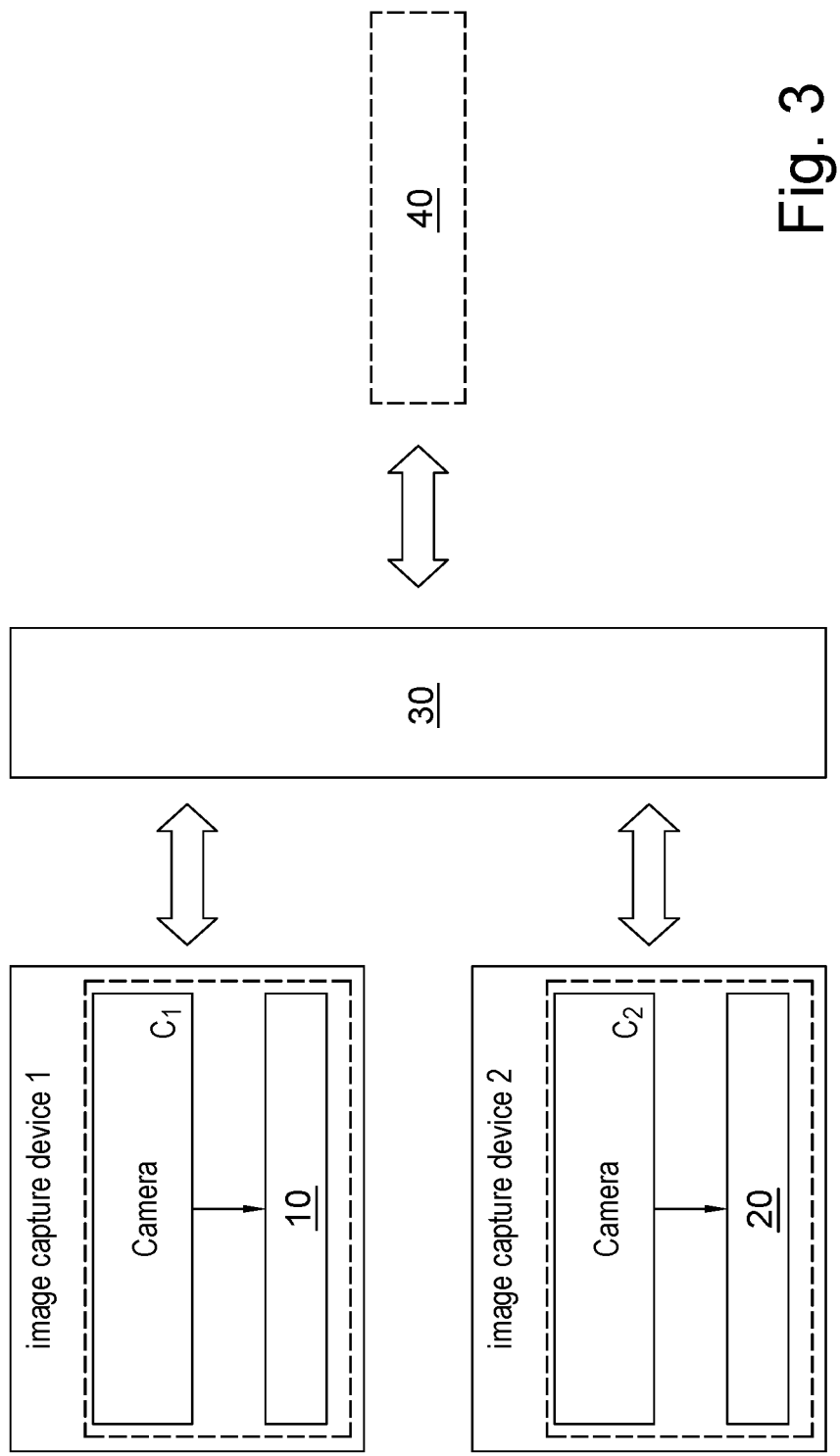

STEREOVISION METHOD AND SYSTEM

RELATED APPLICATIONS

This application is a national phase application filed under 35 USC § 371 of PCT Application No. PCT/EP2021/082552 with an International filing date of Nov. 22, 2021, which claims priority of PL Patent Application P.436051 filed Nov. 23, 2020 and GB Patent Application 2018391.9 filed Nov. 23, 2020. Each of these applications is herein incorporated by reference in its entirety for all purposes.

FIELD OF THE INVENTION

The invention relates to a system and method for detection and localization of moving objects at medium and long distances.

BACKGROUND OF THE INVENTION

Collisions of objects such as animals and drones with wind turbines, aircraft and other high value installations can lead to accidents which are endanger wildlife and also cause damage to infrastructure. However, collisions can often be prevented if the moving objects are detected early enough. There is therefore both an environmental and industrial benefit to the reliable detection and accurate localization of moving objects.

Stereovision provides a technique to monitor and locate moving objects in the ground and the air. However, prior art systems are limited in that they have a fixed field of view in which the optical axes of the cameras are perpendicular to the base line between the cameras. This creates a fixed observation area and objects approaching from different angles cannot be detected unless a further pair of stereoscopic cameras is installed or a specific rotating system moving whole large baseline is installed.

It is therefore an object of the invention to make the range of observation area defined as a stereovision field of view more flexible and decrease the devices' size, without compromising configurability of a pair of stereoscopic cameras.

SUMMARY OF THE INVENTION

According to the invention there is provided a system for determining the distance, Dk of a detected object to a line through the centres of two cameras. The system comprises a first camera C1, a second camera C2, a line between centres of the first and second camera forming a baseline B, and a processing system configured to receive data from the first camera C and the second camera C2 to determine the position of an object, when the first and second cameras are oriented with their optical axes with an angle $\alpha$ to the base line.

Contrary to conventional systems this allows a much greater degree of flexibility in the position of the cameras as the optical axes of the cameras need not be perpendicular to the base line between the cameras' centres. The cameras may be positioned adjacent to each other horizontally, vertically above each other or even at an angle (no-vertical and non-horizontal) to each other. However, the optical axes of the cameras need to be parallel. Furthermore, the cameras may be rotatable such that they can detect and localize a moving object coming from any direction and therefore a greater field of view is possible.

The first and second cameras have an angular field of view, ($\varphi_0$ and a resolution, $y_0$ along Y1 and Y2 axes. The first and second cameras have first and and second axes respectively which are perpendicular to the base line B and the optical axis of the respective camera. The Y1 and Y2 axes initially lie on the same line as the base line B and are within the image plane of the respective camera and perpendicular to the first and second axes respectively. The pixel's number of the centre of the object projection on the image plane of the first camera C1 along a Y1 axis is $y_1$ and the pixel number of the centre of the object projection on the image plane of the second camera C2 along a Y2 axis is $y_2$. The processing system may be configured to use angles ($\varphi_0$, $y_0$, the length of baseline, B and angle $\alpha$, and pixel numbers $y_1$ and $y_2$ to determine the position of an object.

According to some embodiments the distance Dk is given by:

$$Dk = \frac{B*\cos(\alpha)*y_0}{2*\tan\left(\frac{\varphi_0}{2}\right)(y_1 - y_2)} + \frac{B*\sin(\alpha)*y_2}{(y_1 - y_2)}$$

The first and second cameras and the processing system may be connected to a network and such an arrangement allows remote processing of the data.

The first camera C1 may be rotatable about its axis X1 defined as an axis perpendicular to Y1 and lying within the centre of the image plane of the camera and the second camera C2 may be rotatable about an axis X2 parallel to the axis X1 and lying within the centre of the image plane of the camera C2. This enables objects to be viewed around the X axes.

The first camera C1 may be rotatable about an axis Y1 which is perpendicular to the axis X1 and lies on the base line B and the second camera C2 may be rotatable about an axis Y2 which is parallel to the axis Y1. This enable objects to be viewed around Y axes.

If the cameras rotate there may be a control system configured to control the cameras to rotate the first and second cameras equally such that the object remains in the stereovision field of view.

The processing system may be configured to determine the position of the object in three dimensions based on the determined distance, D and the position of the object on the image plane in at least one of the first camera C1 and the second camera C2. An accurate three-dimensional position is helpful to take evasive action should it be necessary. If a three-dimensional position of a moving object is determined at more than one point in time then its velocity can be determined which can aid evasive action still further.

According to the invention there is provided a system allowing bird mortality mitigation as described above, wherein the first camera C1 and the second camera C2 are arranged substantially vertically above each other.

According to the invention there is provided a method for determining the distance, D, of an object from a first camera C1, the method comprising receiving first image data from a first camera C1, receiving second image data from a second camera C2, determining the distance of an object from a first camera C1, the distance being calculated by:

$$D = \frac{B*\cos(\alpha)*y_0}{2*\tan\left(\frac{\varphi_0}{2}\right)(y_1 - y_2)} + \frac{B*\sin(\alpha)*y_2}{(y_1 - y_2)}$$

wherein $\varphi_0$ is the angular field of view of each of the cameras, $y_0$ is the resolution of each of the cameras along the Y1 and Y2 axes, $y_1$ is the number of the pixel which represents the object's centre projection on the image plane of the first camera C1 on the Y1 axis, $y_2$ is the number of the pixel which represents the object's centre projection on the image plane of the second camera C2 on the Y2 axis, B is a length of base line between the first and second cameras' optical axes and a is the angle of the cameras relative to the base line. The first camera is the camera which is closest to the object.

The position of the object in 3D space may be calculated based on the determined distance, D and the projection of the object's centre on the image plane at least one of the first camera C1 or the second camera C2.

According to the invention there is provided computer program code means configured to carry out the steps as described above.

BRIEF DESCRIPTION OF THE DRAWINGS

FIG. 3 depicts a system architecture and its components according to the invention.

DETAILED DESCRIPTION

The invention is a customized stereovision monitoring system for locating distant objects. The system along with the algorithmic methods enables an extraction of the 3D features from images. In classic stereovision, the cameras' optical axes are perpendicular to a baseline (where the baseline is the line segment connecting cameras' centres) and then cameras' image planes are placed on the same Euclidean plane. The invented configuration is characterized in that the cameras' optical axes are set at an angle ($\alpha$) with respect to the base line (which can be horizontal or vertical or neither horizontal nor vertical) in such a way that the image planes of the invented system are placed on two parallel planes. The range of angle $0°<\alpha<360°$.

Figure 1A:
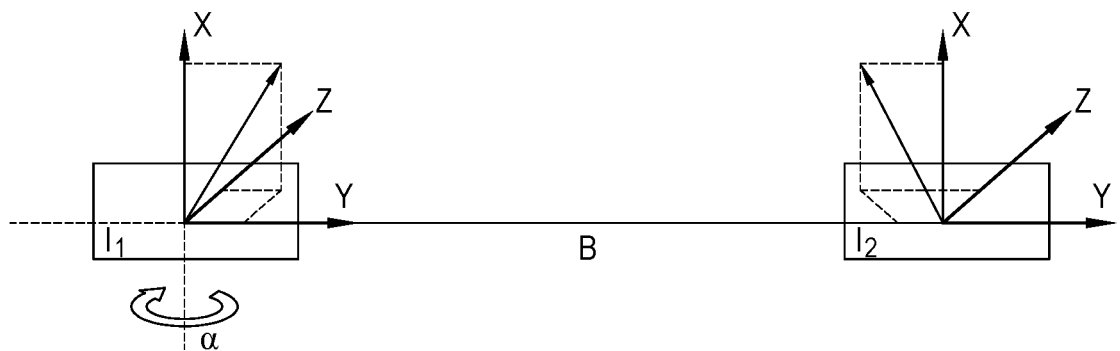
FIGS. 1a and 1b depict a basic configuration of a pair of stereoscopic cameras according to the invention.
Figure 1B:
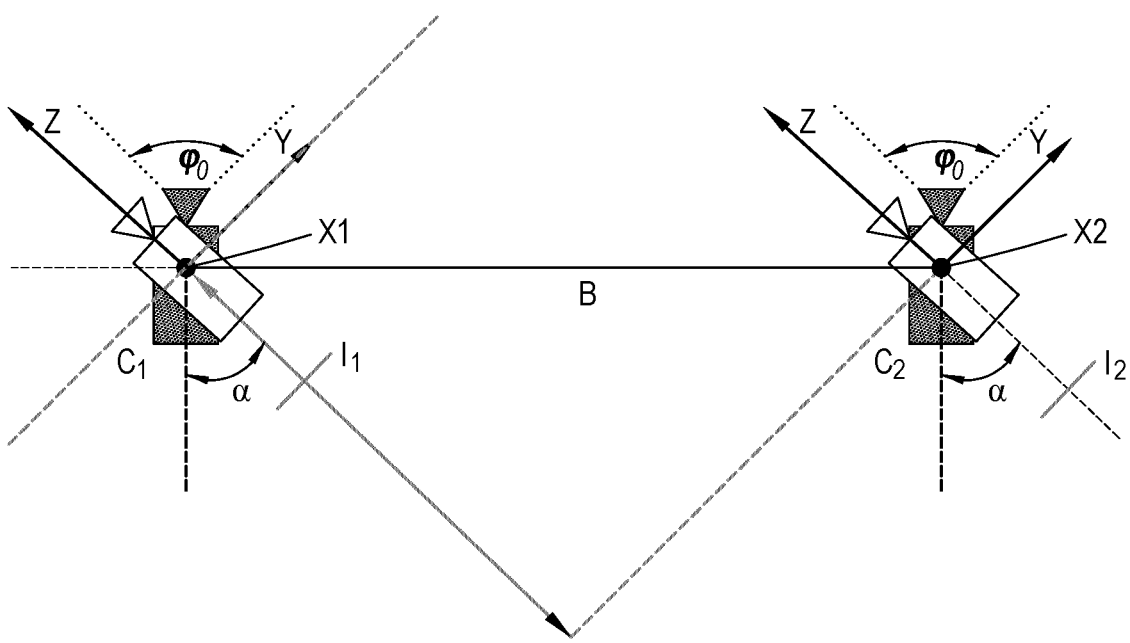

FIG. 1b depicts a camera basic set up according to the invention. There is a first camera C1 which has an image plane I1 and a second camera C2 which has an image plane I2. The cameras are arranged along a baseline B between the two camera centres and the optical axes of the cameras are set at angle $\alpha$ wherein $\alpha$ is substantially non-perpendicular. Directions of X1 and X2 are arranged perpendicular to the base line between the cameras and within the image planes of the cameras.

Figure 2:
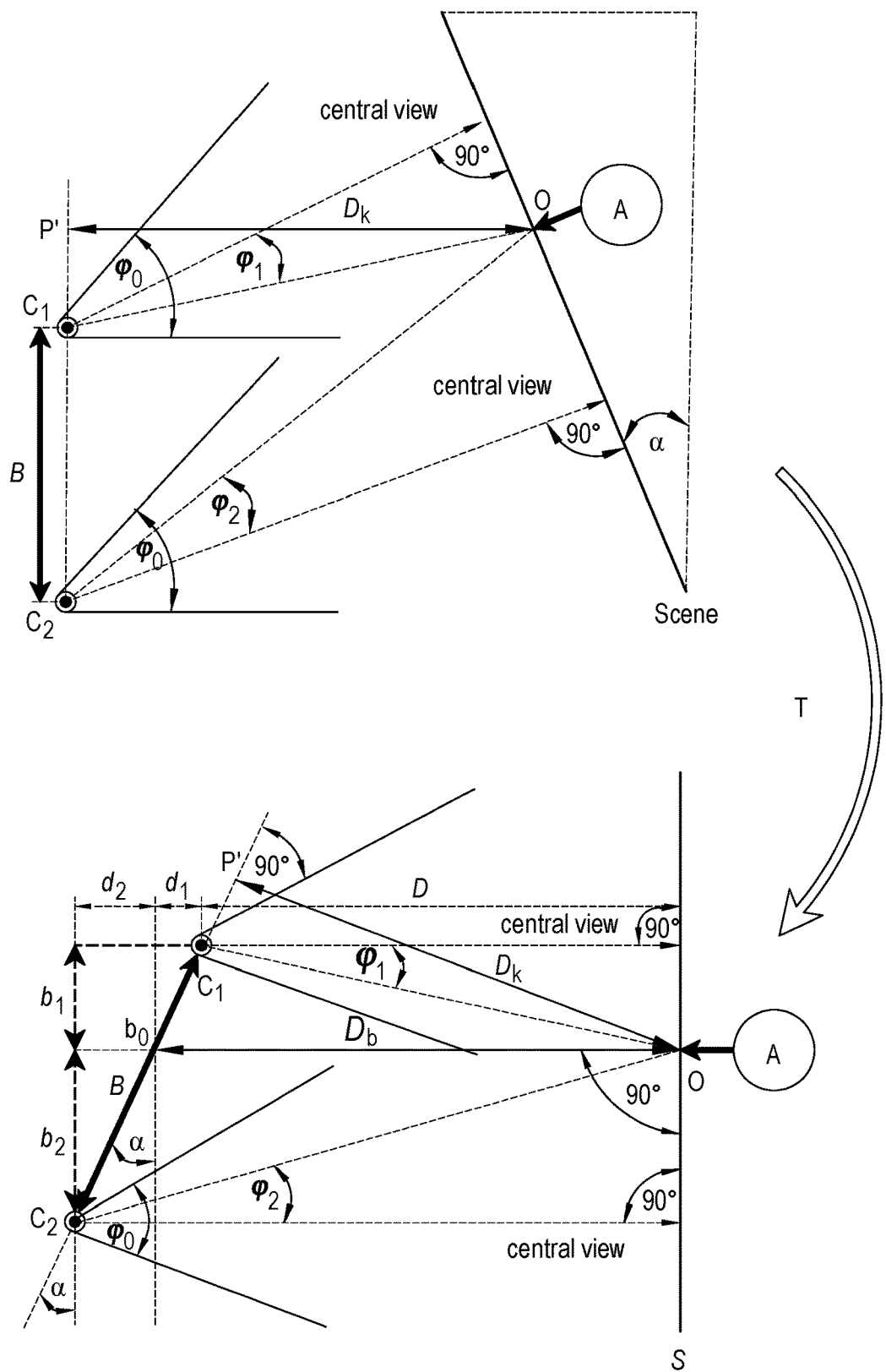
FIG. 2 illustrates an angular transformation of the stereovision system coordinates when optical axes of the cameras are not perpendicular to the base line.

To extract the 3D features from images, the stereovision coordinate system is transformed using its geometric features. The transformation is carried out in relation to the first camera C1 in such that the coordinate system and the scene are shifted by the cameras rotation angle $\alpha$, as shown in FIG. 1 and FIG. 2. The mathematical model needed for computing the object's distance from the vision system is presented below.

| Symbol | Name | Unit |
| --- | --- | --- |
| B | Baseline - the line segment connecting cameras' centres | [m] meter |
| $D_b$ | The length of the segment connecting the object with the line through the centres of two cameras along a line parallel to the optical axis of the cameras | [m] meter |
| Dk | The distance of a detected object to a line through the centres of two cameras | [m] meter |
| $b_0$ | The intersection point of line of $D_b$ with the baseline | [–] |
| $b_1$ | Distance from the first camera C1 to $b_0$ in a direction perpendicular to the optical axes of the cameras | [m] meter |
| $b_2$ | Distance from the second camera C2 to $b_0$ in a direction perpendicular to the optical axes of the cameras | [m] meter |
| D | Distance from the first camera to the plane of the object, wherein the plane of the object is a plane perpendicular to the optical axes of the cameras | [m] meter |
| $d_1$ | Distance from the first camera C1 to $b_0$ in a direction parallel to the optical axes of the cameras | [m] meter |
| $d_2$ | Distance from the second camera C2 to $b_0$ in a direction parallel to the optical axes of the | [m] meter |
| $\varphi_0$ | Cameras' field of View, FoV | [°] planar angle |
| $\varphi_1$ | Angle between the projection line of the object on the first camera C1 and the optical axis of the first camera | [°] planar angle |
| $\varphi_2$ | Angle between the projection line of the object on the second camera C2 and the optical axis of the second camera | [°] planar angle |
| $\alpha$ | Rotation angle defined as an angle between the (parallel) optical axes of the cameras and the base line. The rotation of the first camera C1 is around a first axis, perpendicular to the optical axis of the first camera and the rotation of the second camera C1 is around a second axis, parallel to the first axis. | [°] planar angle |
| $y_0$ | Cameras' resolution along the Y axes wherein the Y axis of a camera is perpendicular to the rotational axis of the camera (the first axis for the first camera and the second axis for the second camera) and within the image plane of the corresponding camera. | [px] pixel |
| $y_1$ | The pixel number of the object's centre projection on the image plane of the camera C1 along the Y1 axis wherein the Y1 axis is perpendicular to the rotational axis of C1 and within the image plane of the camera. | [px] pixel |

| Symbol | Name | Unit |
|---|---|---|
| $y_2$ | The pixel number of the object's centre projection on the image plane of the camera C2 along the Y2 axis wherein the Y2 axis is perpendicular to the rotational axis of C2 and within the image plane of the camera. | [px] pixel |

The distance of the detected object from the line on which the base line lies can be computed using the following formulae:

$$D=D_k$$

$$D=D_b-d_1$$

$$b_1=D*\tan \varphi_1$$

$$b_2=D*\tan \varphi_2$$

$$B*\cos(\alpha)=(b_1+b_2)$$

$$B*\cos(\alpha)=(D_b-d_1)*\tan \varphi_1+(D_b+d_2)*\tan \varphi_2$$

$$d_1+d_2=B*\sin(\alpha) \rightarrow d_2=B*\sin(\alpha)-d_1$$

$$B*\cos(\alpha)=(D_b d_1)*\tan \varphi_1 (D_b+B*\sin(\alpha)-d_1)*\tan \varphi_2$$

$$B*\cos(\alpha)=D*\tan \varphi_1+(D+B*\sin(\alpha))*\tan \varphi_2$$

$$B*[\cos(\alpha)-\sin(\alpha)*\tan \varphi_2]=D*[\tan \varphi_1+\tan \varphi_2]$$

$$D = \frac{B*[\cos(\alpha)-\sin(\alpha)\tan\varphi_2]}{\tan\varphi_1+\tan\varphi_2}$$

$$\frac{y_1}{\frac{y_0}{2}} = \frac{\tan\varphi_1}{\tan\frac{\varphi_0}{2}} \rightarrow \tan\varphi_1 = \frac{y_1*\tan\frac{\varphi_0}{2}}{\frac{y_0}{2}}$$

$$\frac{-y_2}{\frac{y_0}{2}} = \frac{\tan\varphi_2}{\tan\frac{\varphi_0}{2}} \rightarrow \tan\varphi_2 = \frac{-y_2*\tan\frac{\varphi_0}{2}}{\frac{y_0}{2}}$$

$$D = \frac{B*y_0*[\cos(\alpha)-\sin(\alpha)\tan\varphi_2]}{2*\tan\left(\frac{\varphi_0}{2}\right)(y_1-y_2)}$$

$$D = \frac{B*\cos(\alpha)*y_0}{2*\tan\left(\frac{\varphi_0}{2}\right)(y_1-y_2)} - \frac{B*\sin\alpha*y_0*\tan\varphi_2}{2*\tan\left(\frac{\varphi_0}{2}\right)(y_1-y_2)}$$

The second part of the equation can be simplified as:

$$\frac{-B*\sin\alpha*y_2}{(y_1-y_2)}$$

Then, D can be defined as:

$$D = \frac{B*\cos(\alpha)*y_0}{2*\tan\left(\frac{\varphi_0}{2}\right)(y_1-y_2)} + \frac{B*\sin(\alpha)*y_2}{(y_1-y_2)}$$

This enables the distance of objects to be calculated when the cameras' optical axes are not arranged perpendicularly to the base line B. This means that cameras do not need to be arranged along lines perpendicular to the direction of detection and so a greater range of configurations of cameras is possible.

Furthermore, in an embodiment both the first camera C1 and the second camera C2 are arranged to rotate around the X1 and X2 axes. The first camera C1 and the second camera C2 are configured to be rotated in so that their optical axes are both at the same angle α to the base line.

The description above refers to the cameras being rotated around X1 and Y2 axes and the cameras' optical axes being at a non-right angle α to the baseline. However, they could instead, or additionally, be rotated around the Y1 and Y2 axes (namely the other axes of the image planes of the cameras) and similar calculations could be carried out. The resulting distance calculation would be:

$$D = \frac{B*\cos(\alpha)*x_0}{2*\tan\left(\frac{\varphi_x}{2}\right)(x_1-x_2)} + \frac{B*\sin(\alpha)*x_2}{(x_1-x_2)}$$

The cameras are depicted as being arranged side by side, but they could equally be arranged vertically. Such an arrangement would be particularly suitable near a tower of wind turbine as the cameras could be located on the wind turbine itself.

The present invention may be used to detect objects in the vicinity of airfields or wind turbines or even very tall buildings. It may be used to detect any flying object but particularly birds or drones. The detection of such objects allows evasive action to be taken if necessary.

Although the invention is described with respect to cameras detecting visible light in the visible range, infra-red cameras could also be used to detect moving objects at night.

FIG. 3 depicts the basic hardware configuration of the monitoring system according to the invention. The system comprises two image capturing devices. As can be seen the first image capture device comprises a camera C1 and a local processing unit 10. The second image capture device comprises a camera C2 and a local processing unit 20. Both image capture devices are connected, via a network 30 to a processing system 40. The network 30 may be hardwired network or a wireless network. Images captured by the cameras can therefore be processed locally on a local processing unit or remotely on processing system. Within the invention the cameras are coupled in a stereoscopic mode, although the cameras may operate independently and separately. Each camera can be equipped with an additional local processing (CPU or/and GPU) unit applying an embedded object detection algorithm.

Preservation of moving object detected at medium and long distances and its 3D localization require real time processing of high-resolution images. To reduce the computational costs, the monitoring system may be implemented as a distributed computing system. In this option, each of image capturing devices would work independently as a standalone subsystem sending acquired pre-processed information to the processing system 40. Based on data from two image capturing devices, the processing system computes the 3D coordinates of the detected objects.

The image capturing devices can work in a synchronous or asynchronous mode. When they work in the synchronous mode, the processing system triggers image capturing so that images are captured by both cameras at the same time. If the image capturing devices work in the asynchronous mode as standalone units, the processing system adjusts data of images based on the timestamp specified by network time protocol.

Various further aspects and embodiments of the present invention will be apparent to those skilled in the art in view of the present disclosure.

"and/or" where used herein is to be taken as specific disclosure of each of the two specified features or components with or without the other. For example, "A and/or B" is to be taken as specific disclosure of each of (i) A, (ii) B and (iii) A and B, just as if each is set out individually herein.

Unless context dictates otherwise, the descriptions and definitions of the features set out above are not limited to any particular aspect or embodiment of the invention and apply equally to all aspects and embodiments which are described.

It will further be appreciated by those skilled in the art that although the invention has been described by way of example with reference to several embodiments. It is not limited to the disclosed embodiments and that alternative embodiments could be constructed without departing from the scope of the invention as defined in the appended claims.

The invention claimed is:

1. A system for detecting and localizing an object in 3D space, the system comprising:
a first camera having an optical axis and a first axis which is perpendicular to a baseline and the optical axis of the first camera;
a second camera having an optical axis parallel to the optical axis of the first camera and a second axis which is parallel to the first axis of the first camera; and
a processing system configured to receive data from the first camera and the second camera and to determine the position of an object when the first and second cameras are oriented with their optical axes at an angle $\alpha$ to the baseline, wherein $\alpha$ is substantially non-right angle,
wherein the first camera is rotatable about the first axis and the second camera is equally rotatable about the second axis,
wherein the processing system is configured to detect and localise the object, including by calculation of a distance, D, of the object to a line including the baseline, B, connecting the centre of the first and the centre of the second camera, and
wherein the distance D, is given by:

$$D = \frac{B*\cos(\alpha)*y_0}{2*\tan\left(\frac{\varphi_0}{2}\right)(y_{1r} - y_{2r})} + \frac{B*\sin(\alpha)*y_2}{(y_{1r} - y_{2r})}$$

where $y_{1r}$ is the number of the pixel which represents the object's centre projection on the image plane of the first camera C1 and $y_{2r}$ is the number of the pixel which represents the pixel's number of the object's canter projection on the image plane of the second camera C2.

2. The system according to claim 1 wherein the first and second cameras have an angular field of view, $\varphi_0$ and a resolution, $y_0$, along a Y axis of each camera wherein the Y axis of each camera is perpendicular to the first axis or second axis of the respective camera and within the image plane of the respective camera and the pixel number of the object projection on the image plane of the first camera along its Y axis is $y_1$ and the corresponding pixel number of the object projection on the image plane of the second camera along its Y axis is $y_2$ and wherein the processing system is configured to use $\varphi_0$, $y_0$, $y_1$, and $y_2$ to determine the position of an object.

3. The system according to claim 1 wherein the processing system is configured to additionally use the length of the baseline, B and $\alpha$, the angle of the cameras' optical axes relative to the baseline.

4. The system according to claim 1, further comprising a network, the first and second cameras and the processing system each being connected to the network.

5. The system according to claim 1, wherein the first camera is rotatable about a third axis which is perpendicular to the first axis and the base line B and the second camera is rotatable about a fourth axis which is parallel to the third axis of rotation.

6. The system according to claim 5 further comprising a control system configured to control the cameras to rotate the first and second cameras in parallel such that the object remains in the field of view of the first and second camera.

7. The system according to claim 1, wherein the processing system is configured to determine the position of the object in three dimensions based on the determined distance, D and the position of the object on the image plane in at least one of the first camera and the second camera.

8. The system according to claim 1, wherein the system is installed at a wind turbine tower and configured to monitor avifauna or/and to mitigate the collision risk of objects with the wind turbine tower; wherein the collision risk is mitigated by the system determining the position of an object such that evasive action can be taken; and wherein the first camera and the second camera are arranged substantially vertically above each other.

* * * * *